US011445586B2

(12) United States Patent
Wang et al.

(10) Patent No.: US 11,445,586 B2
(45) Date of Patent: Sep. 13, 2022

(54) ADAPTIVE POWER BALANCING IN LED LAMPS

(71) Applicants: iWatt Integrated Circuits Technology (Tianjin) Limited, Tianjin (CN); iWatt Integrated Circuits (Shenzhen) Limited, Shenzhen (CN)

(72) Inventors: Nailong Wang, Beijing (CN); Bin Hou, Shanghai (CN); Zhenyu Song, Beijing (CN); Wei Qi, Beijing (CN); Guanglai Deng, Beijing (CN); Zhiqiu Ye, Beijing (CN)

(73) Assignees: Dialog Integrated Circuits (Tianjian) Limited, Tianjin (CN); Dialog Semiconductor (Shenzhen) Limited, Shenzhen (CN)

( * ) Notice: Subject to any disclaimer, the term of this patent is extended or adjusted under 35 U.S.C. 154(b) by 600 days.

(21) Appl. No.: 15/407,350

(22) Filed: Jan. 17, 2017

(65) Prior Publication Data
US 2017/0127488 A1 May 4, 2017

Related U.S. Application Data

(63) Continuation of application No. PCT/CN2014/082420, filed on Jul. 17, 2014.

(51) Int. Cl.
H05B 45/38 (2020.01)
H05B 45/10 (2020.01)
(Continued)

(52) U.S. Cl.
CPC ............. *H05B 45/38* (2020.01); *H02J 9/061* (2013.01); *H05B 45/10* (2020.01); *H05B 45/382* (2020.01)

(58) Field of Classification Search
CPC ........ H05B 45/37; H05B 45/50; H05B 45/10; H02J 9/061
(Continued)

(56) References Cited

U.S. PATENT DOCUMENTS 6,198,403 B1 * 3/2001 Dorrough .......... G01R 19/2513
324/133
7,936,132 B2 5/2011 Quek et al.
(Continued)

FOREIGN PATENT DOCUMENTS

CN 201382352 1/2010
CN 102099621 6/2011
(Continued)

OTHER PUBLICATIONS

Chinese Search Report, Chinese Patent App. No. 2015100649740, 2 pages.
(Continued)

*Primary Examiner* — Rexford N Barnie
*Assistant Examiner* — Swarna N Chowdhuri
(74) *Attorney, Agent, or Firm* — Saile Ackerman LLC; Stephen B. Ackerman

(57) ABSTRACT

A lighting system and a method are provided with an adaptive power balancing scheme which reduces or eliminates flicker by sensing the operation of a lamp that is connected to an electronic transformer and adaptively controlling the drive circuit of the lamp to prevent unexpected reset of the electronic transformer. There is provided a lamp with a light source and a drive circuit for the light source; said drive circuit has a power stage for regulating a voltage supplied to the light source, an energy storage device, and control means arranged to selectively disable the power stage. Power is provided to the light source by the energy storage device when the power stage is disabled.

30 Claims, 8 Drawing Sheets

(51) Int. Cl.
*H05B 45/382* (2020.01)
*H02J 9/06* (2006.01)

(58) Field of Classification Search
USPC .......................................................... 307/66
See application file for complete search history.

(56) References Cited

U.S. PATENT DOCUMENTS

| | | | |
|---|---|---|---|
| 8,199,537 | B2 | 6/2012 | Yan et al. |
| 8,686,662 | B1* | 4/2014 | Bragg .................... H02J 9/065 315/159 |
| 2010/0208500 | A1 | 8/2010 | Yan et al. |
| 2011/0109164 | A1* | 5/2011 | Mohammed Suhura .................... H05B 47/185 307/66 |
| 2012/0001559 | A1* | 1/2012 | Tunnicliffe ............. H05B 45/37 315/210 |
| 2013/0200707 | A1* | 8/2013 | Hartmann .............. H05B 47/18 307/39 |
| 2013/0313974 | A1* | 11/2013 | Fan ........................ H05B 47/24 315/200 R |
| 2015/0256100 | A1* | 9/2015 | De Vaal ............. H05B 45/3575 363/126 |
| 2016/0073455 | A1* | 3/2016 | Takacs .................. H05B 45/10 315/297 |

FOREIGN PATENT DOCUMENTS

| | | |
|---|---|---|
| CN | 103228085 | 7/2013 |
| CN | 103269537 | 8/2013 |
| CN | 103313467 | 9/2013 |
| CN | 103327700 | 9/2013 |
| CN | 103763842 | 4/2014 |
| EP | 2 456 041 | 5/2012 |
| WO | WO 2016/008141 | 1/2016 |

OTHER PUBLICATIONS

Chinese Office Action, Chines Patent App. No. 201510064974.0, dated Apr. 21, 2017, 2017041801441950, 8 pages, and English language translation, 9 pages.
Chinese Office Action, Chinese Patent App. No. 201510064974.0, dated Jan. 19, 2018, 2018011600816220, 4 pages, and English language translation, 3 pages.
Chinese Office Action, Chinese Patent App. No. 201510064974.0, dated Apr. 21, 2017, 2018101001836420, 3 pages, and English language translation, 2 pages.

* cited by examiner

ADAPTIVE POWER BALANCING IN LED LAMPS

TECHNICAL FIELD

The present disclosure relate to adaptive power balancing in light emitting-diode (LED) lamps, and in particular to a lamp, a lighting system and a method of controlling power supplied to a light source by a drive circuit in a lamp. A "lamp" comprises a light source that emits photons, and may also be generally referred to as a "light bulb".

BACKGROUND

Low voltage lighting systems have become a popular alternative to incandescent lamps which operate directly from a mains voltage. The mains voltage is an AC voltage of either around 110V or around 220V at a frequency of 50 Hz or 60 Hz although these values will vary according to country or area, ranging from 100-127V and 220-240V.

A low voltage lighting system comprises a lamp requiring an operating voltage lower than the mains voltage. A low voltage lighting system is illustrated in FIG. 1 and comprises an electronic transformer 100 that converts an AC mains voltage 102 to a lower lamp input voltage 104 for powering one or more low voltage lamps 106.

FIG. 2a illustrates how a mains voltage (V_MAINS) varies over time, and FIG. 2b illustrates how a lamp input voltage (V_ET) provided by the transformer 100 varies over time.

Electronic transformers require a minimum output load to operate properly. If the load presented by the connected lamp or lamps 106 drops below the electronic transformer threshold, the electronic transformer will reset, causing flicker of the emitted light. FIG. 2c illustrates the electronic transformer operating threshold 200 and the operating load 202 of a lamp. The operating load 202 is inversely proportional to the AC mains input voltage waveform 204.

In this example, the operating load 202 is always higher than the transformer's operating threshold 200, so the transformer 100 will not reset. However, if a high efficiency lamp is provided, the operating load 202 is much lower, which significantly increases the likelihood of the load dropping below the threshold of the electronic transformer.

As an example, the operating load 202 will normally be higher than the transformer's operating threshold 200 when a halogen lamp is used, but an equivalent light-emitting diode (LED) lamp will have an increased likelihood of the load dropping below the threshold of the electronic transformer and hence being prone to flickering. An LED lamp is any kind of lamp which comprises an LED as its light source.

There is also a wide variation in the output voltage and operating frequency of electronic transformers between different lighting systems. Furthermore, the electronic transformer threshold varies greatly from device to device. This reduces interoperability because different types of transformers and lamps are not guaranteed to operate correctly together when combined.

SUMMARY

According to a first aspect of the disclosure there is provided a lamp comprising a light source and a drive circuit for the light source; said drive circuit comprising a power stage for regulating a voltage supplied to the light source, an energy storage device, and control means arranged to selectively disable the power stage; wherein power is provided to the light source by the energy storage device when the power stage is disabled.

Optionally, the power stage comprises one or more power transistors and selectively disabling the power stage comprises disabling both the ON and OFF cycles of the power transistors.

Optionally, the control means is arranged to disable the power stage throughout the course of a selected period of a mains power cycle.

Optionally, the selected period of the mains power cycle comprises a period during which the magnitude of the mains voltage has a maximum value.

Optionally, the selected portion of the AC power cycle is defined by a threshold, so that the power stage is disabled when the magnitude of a mains voltage is equal to or exceeds the threshold.

Optionally, the threshold is adjustable.

Optionally, the threshold is dynamically adjustable according to the operation of an electronic transformer for use with the lamp.

Optionally, the selected period of the mains power cycle excludes a period during which an applied phase switch occurs.

Optionally, the light source is an electroluminescent device.

Optionally, the light source is a light-emitting diode.

Optionally, the energy storage device comprises a capacitor.

Optionally, the capacitor is a bulk capacitor that provides a voltage source for the power stage, and the lamp further comprises an output capacitor for providing energy to the light source.

According to a second aspect of the disclosure there is provided a lighting system comprising an electronic transformer coupled with a lamp according to any preceding claim, the electronic transformer being arranged to convert a mains voltage to lamp operating voltage to be supplied to the lamp.

Optionally, the lighting system further comprises a phase switching dimmer.

Optionally, the dimmer is a trailing edge dimmer.

Optionally, the dimmer is a leading edge dimmer.

Optionally, the dimmer is a leading and trailing edge dimmer.

Optionally, the lighting system comprises means to monitor and/or detect a mains AC waveform.

Optionally, the means to monitor and/or detect a mains AC waveform comprises a peak detector.

Optionally, the lighting system comprises means to detect one or more of: a presence of a dimmer; a type of dimmer; or a setting of a dimmer.

According to a third aspect of the disclosure there is provided a method of controlling power supplied to a light source by a drive circuit in a lamp, comprising selectively disabling a power stage of the drive circuit and supplying power through an energy storage device when the power stage is disabled.

Optionally, the power stage comprises one or more power transistors and selectively disabling the power stage comprises disabling both the ON and OFF cycles of the power transistors.

Optionally, the power stage is disabled throughout the course of a selected period of a mains power cycle.

Optionally, the selected period of the mains power cycle comprises a period during which the magnitude of the mains voltage has a maximum value.

Optionally, the selected portion of the AC power cycle is defined by a threshold, so that the power stage is disabled when the magnitude of a mains voltage is equal to or exceeds the threshold.

Optionally, the method comprises adjusting the threshold.

Optionally, the method comprises adjusting the threshold dynamically according to the operation of an electronic transformer for use with the lamp.

Optionally, the selected period of the mains power cycle excludes a period during which an applied phase switch occurs.

Optionally, the light source is an electroluminescent device.

Optionally, the light source is a light-emitting diode.

Optionally, the energy storage device comprises a capacitor.

Optionally, the capacitor is a bulk capacitor that provides a voltage source for the power stage, and the lamp further comprises an output capacitor for supplying power to the light source.

According to a fourth aspect of the disclosure there is provided a method of controlling power supplied to a light source in a lighting system; comprising converting with an electronic transformer a mains voltage to a lamp operating voltage to be supplied to a lamp; coupling the lamp operating voltage with a lamp; and controlling power supplied by a drive circuit for a light source of the lamp according to the third aspect.

Optionally, the lighting system further comprises a phase switching dimmer.

Optionally, the dimmer is a trailing edge dimmer.

Optionally, the dimmer is a leading edge dimmer.

Optionally, the dimmer is a leading and trailing edge dimmer.

Optionally, the method comprises monitoring and/or detecting a mains AC waveform.

Optionally, monitoring and/or detecting a mains AC waveform comprises peak detection.

Optionally, the method comprises detecting one or more of: a presence of a dimmer; a type of dimmer; or a setting of a dimmer.

BRIEF DESCRIPTION OF THE DRAWINGS

The disclosure will be described below, by way of example only, with reference to the accompanying drawings, in which.

DESCRIPTION

The use of high efficiency lamps as replacements for incandescent and halogen bulbs presents challenge. LED lamps will be discussed as an example.

LED lamps offer increased operational efficiency as compared with incandescent lamps including halogen lamps. LED lamps bulbs have faster response time, and when the LED driver is operating in a continuous mode, the instantaneous power consumption closely follows the input voltage waveform. Thus, when using LED lamps in lighting systems, the load for the equivalent amount of light intensity is significantly lower as compared with incandescent lamps including halogen lamps. This significantly increases the likelihood of the load dropping below the threshold of the electronic threshold, creating unwanted flicker.

Figure 3B:
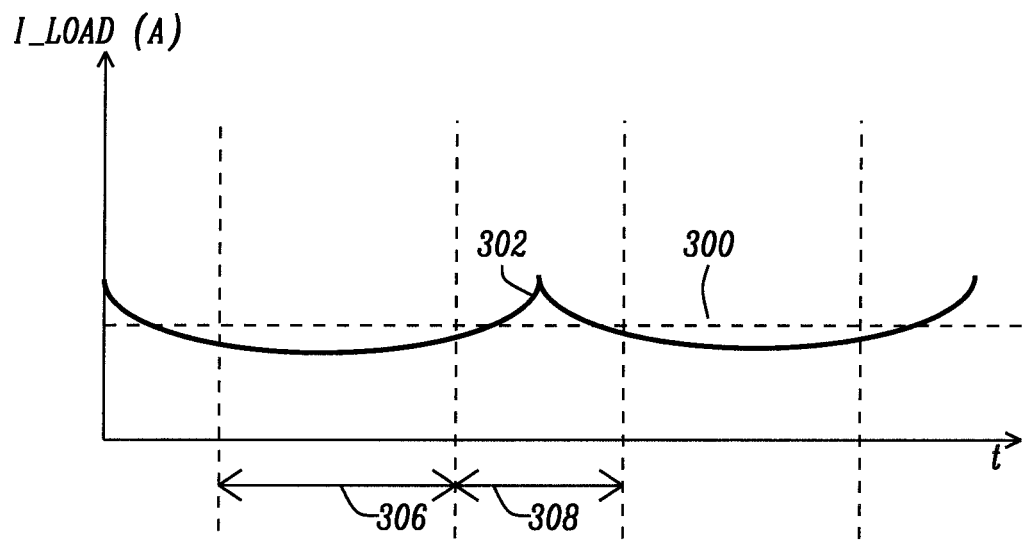
FIGS. 3a and 3b illustrate the operation of a low voltage lighting system, where unwanted flicker occurs due to the load of a lamp falling below the operating load of an electronic transformer.
Figure 3A:
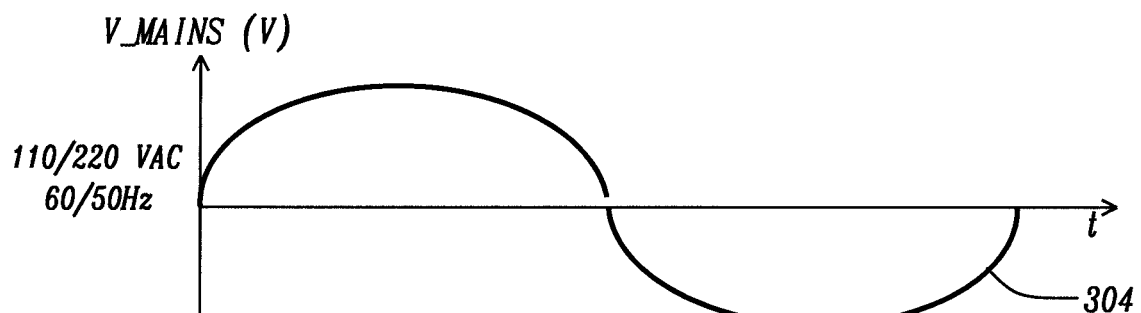

This problem is illustrated with reference to FIG. 3. FIG. 3a illustrates how a mains AC voltage (V_MAINS) varies over time while FIG. 3b shows the electronic transformer operating threshold 300 and the operating load (I_LOAD) 302 of an LED lamp. The operating load 302 is inversely proportional to the AC mains input voltage waveform 304. Throughout the course of a first period 306, the load is below the operational threshold of the transformer. When the load drops below the threshold of the electronic transformer, the electronic transformer shuts off, eliminating the input power to the LED-based bulb and causing flicker. Throughout the course of a second period 308, the load is above the operational threshold of the transformer so the transformer operates normally.

The present disclosure provides a lighting system with an adaptive power balancing control, so that a load current of an electronic transformer remains above its minimum operating threshold.

Figure 4:
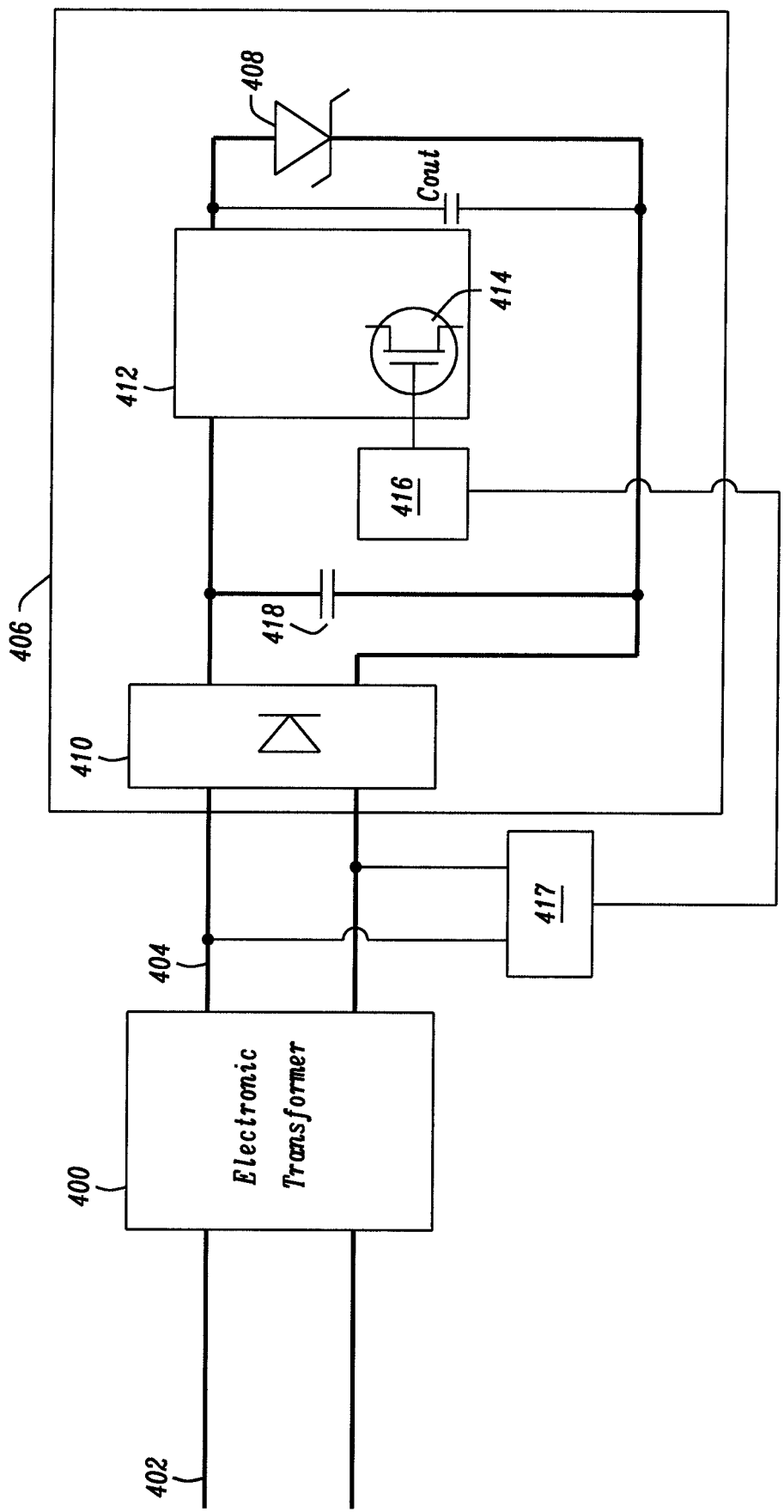
FIG. 4 illustrates a lighting system according to an embodiment of the disclosure, comprising a lamp and an electronic transformer.

FIG. 4 illustrates a lighting system according to an embodiment of the disclosure. An electronic transformer 400 converts an AC mains voltage 402 to a lower lamp input voltage 404 for powering a low voltage lamp 406. It is also possible for the transformer 400 to provide power for multiple lamps 406. The low voltage lamp comprises a light source 408 which in this embodiment comprises a light-emitting diode (LED). A plurality of LEDs may be provided but just one is shown for clarity of illustration. The lamp 406 also comprises a rectifier 410 and a power stage 412. The power stage 412 comprises circuitry that regulates the voltage supplied to the light source 408, providing a steady voltage source (VDC_Boost). The power stage may comprise circuitry including a boost converter. The power stage 412 is operated under the control of a switch device 414 which and a power stage controller 416. The power stage controller 416 may be coupled with the output voltage of the electronic transformer 400. A peak detector 417 or equivalent may be provided (as part of the lamp, part of the transformer or as another component) to determine the shape of the AC voltage. The switch device 414 may comprise one or more power transistors, and is illustrated as a MOSEFT but it may equally be another type of transistor or equivalent switching element. The lamp 406 also comprises an energy storage device 418 coupled between the rectifier 410 and power stage 412.

The power stage controller 416 operates to selectively disable the ON and OFF cycles of the switch device 414 to ensure the load current of the electronic transformer 400 remains above its operating threshold and therefore that the transformer 400 continues to operate normally.

Figure 5:
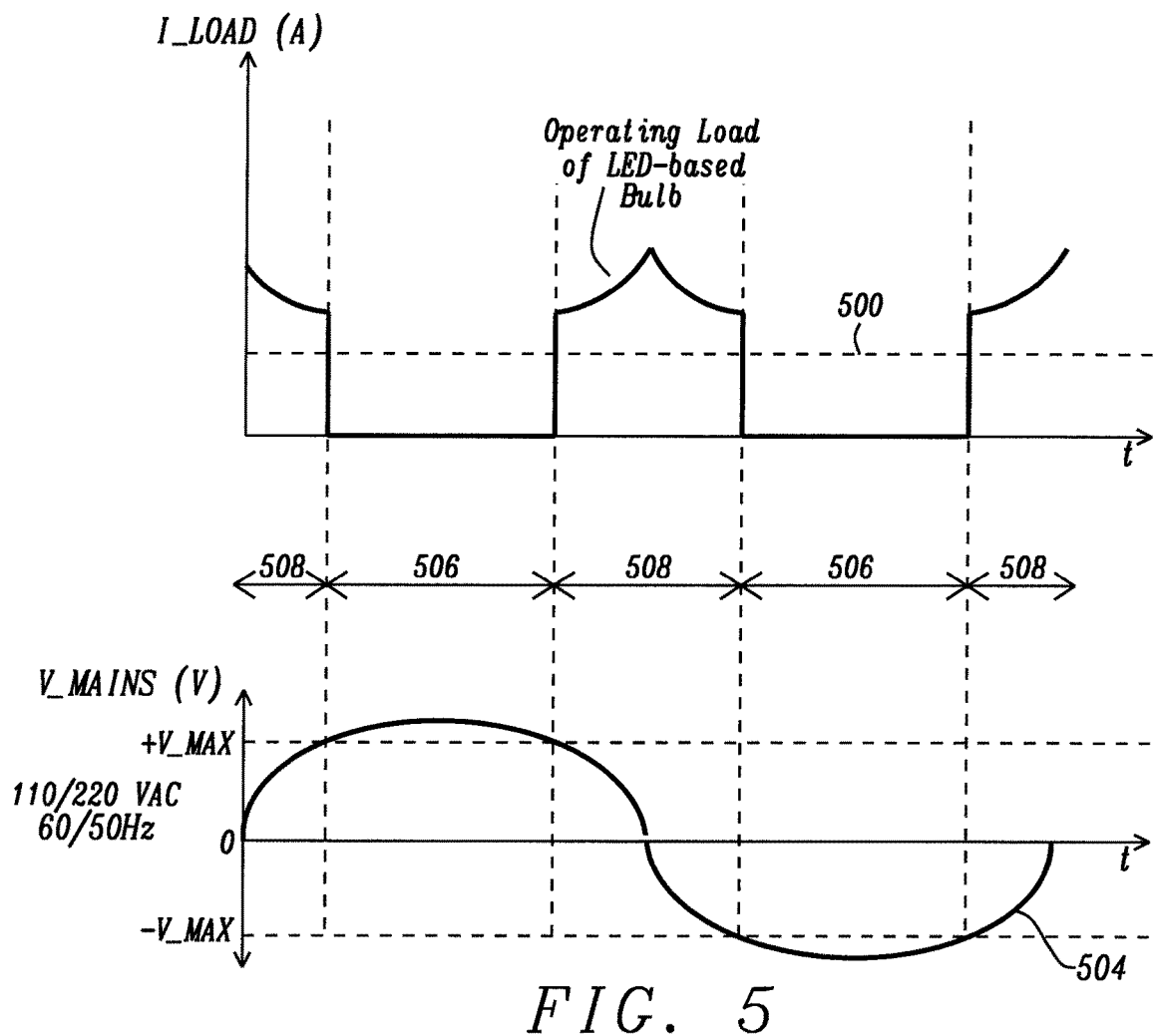
FIG. 5 illustrates aspects of the operation of the lighting system of FIG. 4.

This is illustrated in FIG. 5. As observed for other LED lamps, the load current shape is inversely proportional to the AC-mains input voltage waveform 504, as the output power of the LED lamp remains constant. Therefore, the likelihood of the lamp load current falling below the electronic transformer operating threshold 500 is greatest when the AC mains voltage (V_MAINS) is at its highest magnitude values.

To reduce or eliminate this likelihood, the ON and OFF cycles are disabled throughout the course of periods 506 where the magnitude of the AC mains voltage is above a threshold value V_MAX, creating a no-load condition of the electronic transformer 400. The LED lamp draws power from the energy storage device 418 during these periods 506 so that it can still maintain a constant light output. Current through the LED lamp can be regulated during these periods. The energy storage device 418 may comprise a bulk capacitor or equivalent, which charges while the electronic transformer 400 provides an input voltage. The bulk capacitor provides an unregulated voltage source for the power stage 412. Energy for the light source 408 is provided when the power stage 412 is not operating by an output capacitor. Components of the power stage such as a boost converter may be coupled between the bulk capacitor and the output capacitor.

Throughout the course of periods 508 when magnitude of the AC mains voltage is below the threshold value V_MAX, the controller enables the ON and OFF cycles of the switch device 414. In this region, the load current of the lamp exceeds the electronic transformer threshold 504.

The value of the threshold V_MAX defines the duration of the periods 506 and 508 during which the ON and OFF cycles of the switch device are disabled and enabled. The threshold V_MAX should be set to be relatively low (defining a relatively long period 506 throughout the course of which the switching device 414 will be disabled) when the electronic threshold is relatively high; and conversely should be relatively high (defining a relatively short period 506 throughout the course of which the switching device 414 will be disabled) when the electronic threshold is relatively low. The value of the threshold V_MAX can be set by changing the operating parameters of the power stage controller 416.

By disabling the switch device 414 at the optimum times, the present disclosure allows for the stable operation of the electronic transformer at all times.

Figure 6:
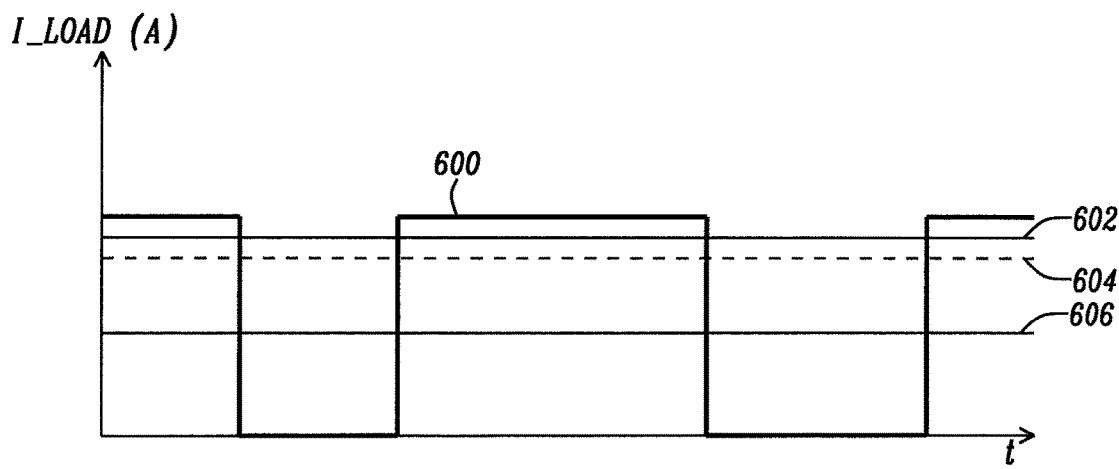
FIG. 6 illustrates different electronic transformer thresholds.

As illustrated by FIG. 6, the operation threshold varies from electronic transformer to electronic transformer. Therefore, existing LED lamps may work well with some electronic transformers, but are unstable or completely fail when used with other electronic transformers. However, the present disclosure allows a high operating load during periods when the ON and OFF cycles of power stage switching devices are enabled, allowing for stable operation when used with all electronic transformers. The transformer load current 600 according to the disclosure is above various thresholds 602, 604, 606 of different electronic transformers.

In another aspect of the disclosure, the threshold periods during which the ON and OFF cycles of the switch device 414 are enabled/disabled may be adjusted. This can be achieved for example by adjusting the threshold V_MAX. This means that flicker can be avoided even where LED lamps have varying load current requirements, and/or where electronic transformers have varying threshold levels. The threshold may also be dynamically adjusted according to the operation of the transformer 400. If the transformer is going into reset, the threshold can be lowered in order to skip a greater portion of each cycle; and likewise, if the transformer is recovering the threshold can be raised to skip a lesser portion of each cycle.

Figure 1:
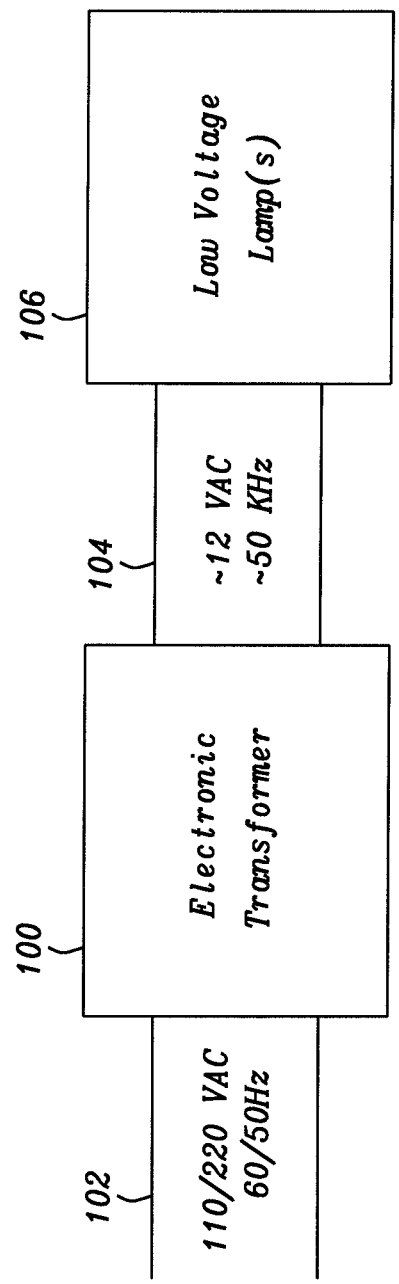
FIG. 1 illustrates a prior art low voltage lighting system.
Figure 2C:
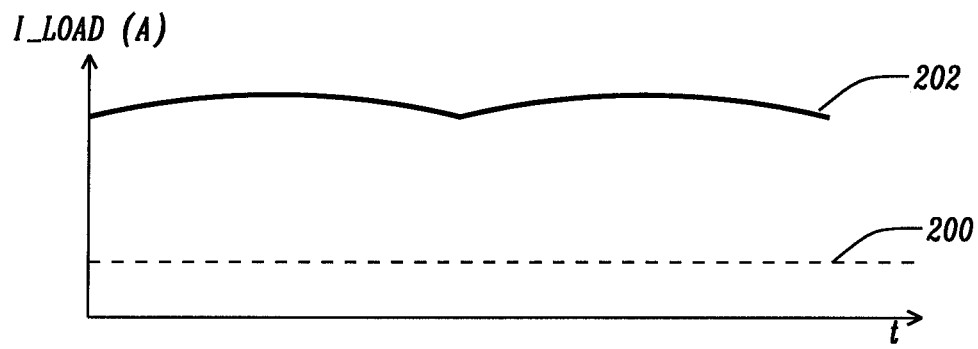
FIGS. 2a, 2b, and 2c illustrate aspects of the operation of the lighting system of FIG. 1.
Figure 2B:
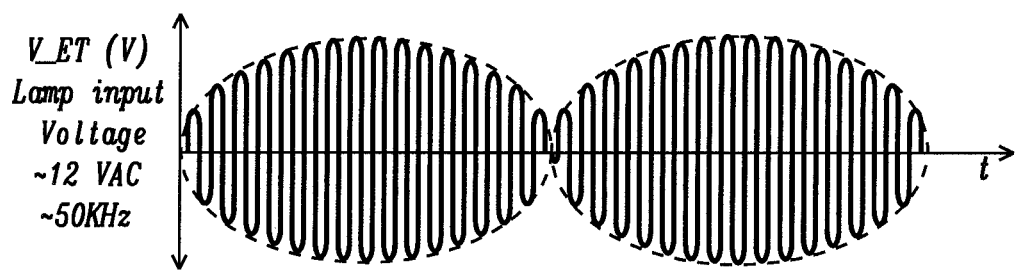
Figure 2A:
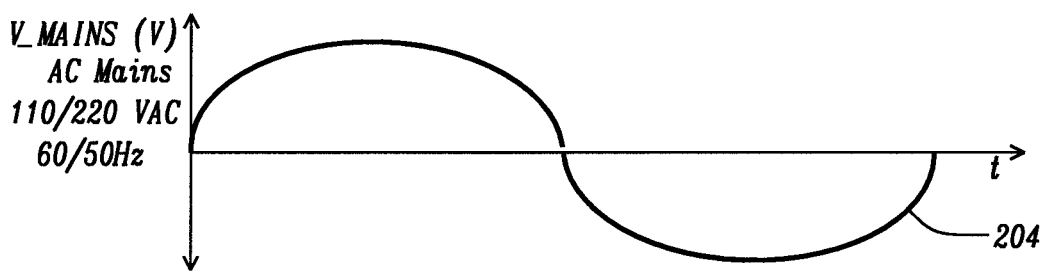
Figure 7:
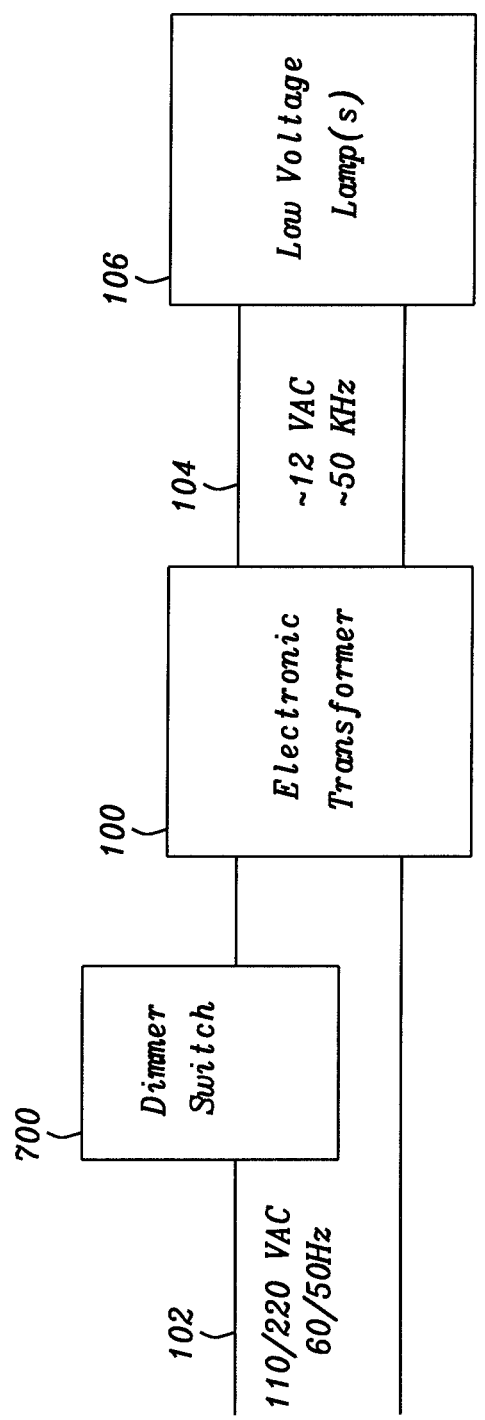
FIG. 7 illustrates a prior art low voltage lighting system in which a dimmer switch is provided.

As mentioned above, FIG. 1 illustrates a generic low voltage lighting system. The lamps are voltage driven devices, meaning that the light output varies with the RMS input voltage. Therefore the light output can be controlled by including a triac-based dimmer switch in series with the electronic transformer. This is illustrated in FIG. 7, in which a dimmer switch 700 is illustrated together with the components from FIG. 1, which are illustrated with like reference numerals.

Figure 8:
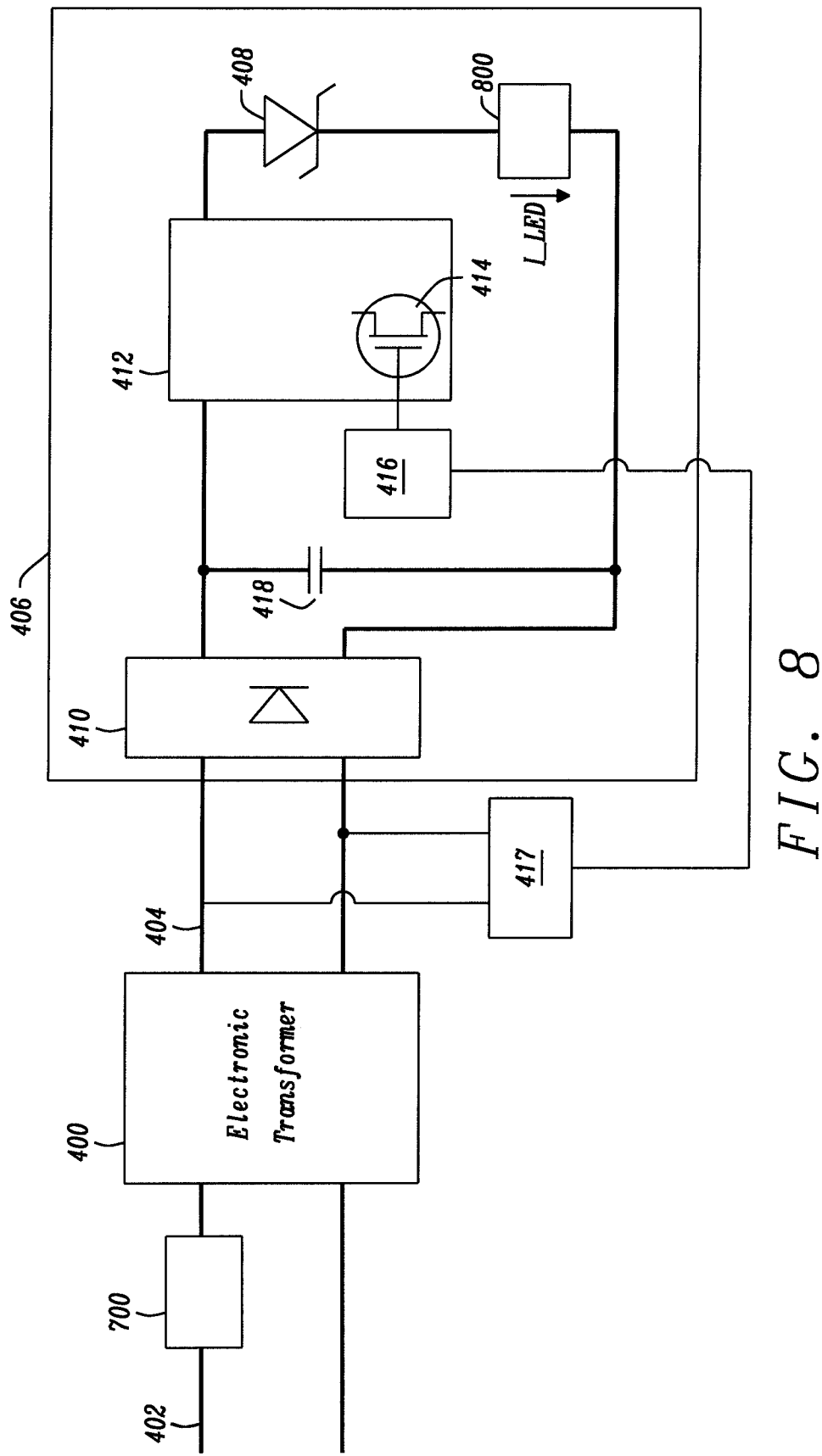
FIG. 8 illustrates a lighting system according to a further embodiment of the disclosure, comprising a lamp and an electronic transformer together with a dimmer switch and dimmer control.

FIG. 8 shows a lighting system according to an embodiment of the disclosure, provided with a dimmer switch 700 and a dimmer controller 800, which controls the light output intensity of the LED device(s) is controlled by the dimming controller by regulating the current through the LED device(s). The remaining components are the same as illustrated in FIG. 4, and are illustrated with the same reference numerals.

In addition to maintaining the proper operation of the electronic transformer 400, adaptively enabling and disabling the ON and OFF cycles of the switch device 414 also ensures proper operation of the lighting system when the electronic transformer 400 is coupled to a phase switching dimmer switch 700, including leading edge dimmer switches and trailing edge dimmer switches.

The disclosure also provides for the monitoring and detection of the low frequency AC input waveform 504. This may include one or more of: detecting the presence of a dimmer switch 700, detecting the type of dimmer switch (for example, leading edge or trailing edge), and detecting the setting of the dimmer (namely the portion of the AC waveform that is chopped by the dimmer). This information can be detected without the need to directly sense the input voltage to the bulb or equivalently, the output of the electronic transformer. This information can be used in order to determine the optimum adaptive power balancing techniques to employ.

Figure 9:
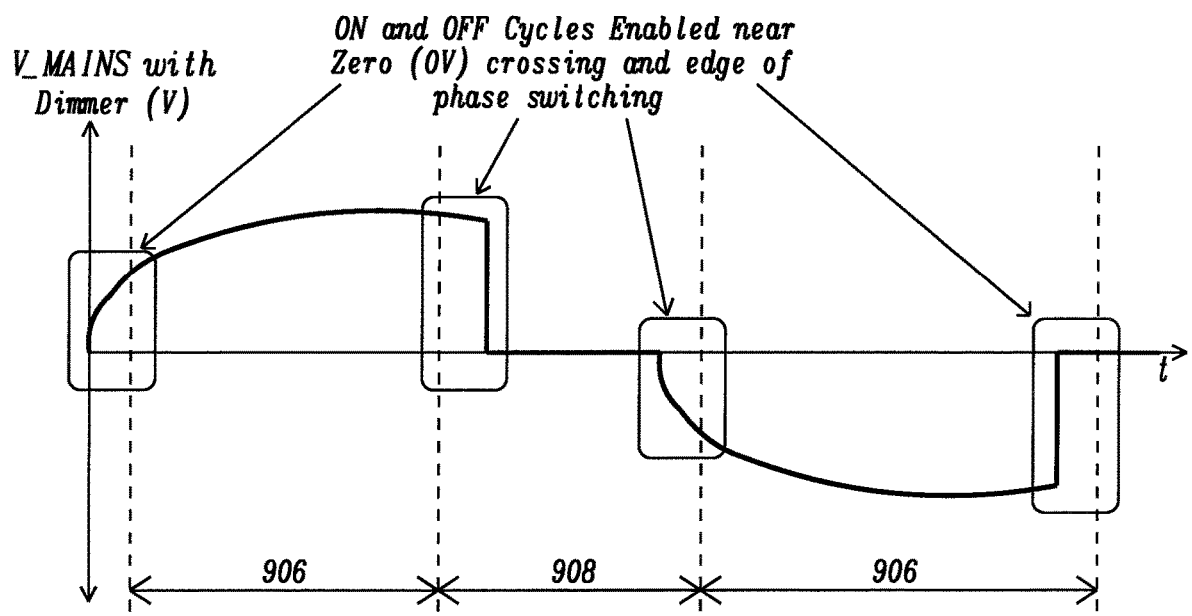
FIG. 9 illustrates aspects of the operation of the lighting system of FIG. 8.

FIG. 9 illustrates an AC input voltage coupled via a trailing edge phase switching dimmer switch. Throughout the course of periods 908 the switching device 414 is enabled while throughout the course of periods 906 the switching device 414 is disabled. As most trailing and/or leading edge dimmer switches employ a triac switching device, care must be given to maintaining a load in order to ensure the proper operation of the dimmer switch. Removing the load current from the AC mains near the zero (0V) crossing of the AC mains waveform, or near the switching point of the phase switching will cause the dimmer switch to reset, causing a disruption to the AC input voltage source. This causes improper operation of the lighting system, such as light flicker, or in some cases, a complete system shutdown.

The present disclosure can address this using the detected AC input voltage signal, and ensuring that the ON and OFF cycles of the switching device 414 are not disabled during periods where the AC input voltage is near zero crossing and near the edge of the phase switching.

Engineering guard-bands can also be defined to ensure proper operation of the lighting system.

The present disclosure reduces flicker by sensing the operation of a lamp that is connected to an electronic transformer and adaptively controlling the drive circuit of the lamp to prevent unexpected reset of the electronic transformer, thereby eliminating operation flicker.

Furthermore, the adaptive control also ensures maximum operational efficiency of the lighting system. It also ensures interoperability between different lamps and transformers.

Figure 10:
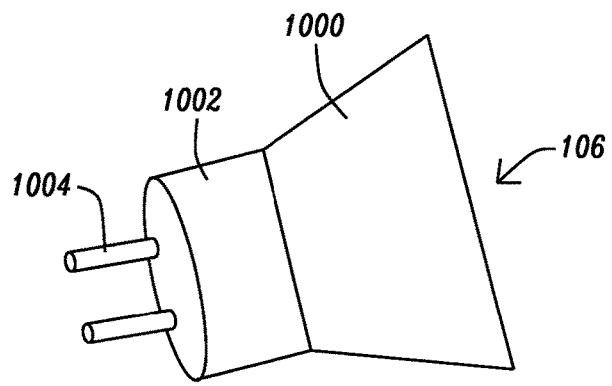
FIG. 10 illustrates a lamp provided in accordance with embodiments of the disclosure.

The present disclosure has utility in a wide range of lighting systems. A typical lamp 106 is illustrated in FIG. 10. Here, a bulb housing 1000 contains a light source which may comprise one or more LEDs. A base 1002 comprises a drive circuit for the light source, and electrical connectors 1004 are provided. The electrical connectors may take various different forms.

One example lighting system to which the disclosure may apply is an MR16 lighting system, which typically provides a lamp operating voltage of 12V at 50 KHz. The present disclosure enables LED lamps to be freely used in MR16 systems in place of halogen lamps without encountering problems of flicker.

Various modifications and improvements can be made to the above without departing from the scope of the disclosure.

What is claimed is:

1. A lamp comprising a light source and a drive circuit for the light source; said drive circuit comprising a power stage for regulating a voltage supplied to the light source, an energy storage device, and a controller arranged to selectively disable the power stage; wherein power is provided to the light source by the energy storage device when the power stage is disabled;

wherein the controller is arranged to disable the power stage throughout the course of a selected period of a mains AC power cycle, wherein the selected period of the mains AC power cycle comprises a period during which the magnitude of the mains voltage has a maximum value;

wherein the selected period of the mains AC power cycle is defined by a threshold, so that the power stage is disabled when the magnitude of a mains voltage is equal to or exceeds the threshold; wherein the threshold is dynamically adjustable according to an operation of a transformer for use with the lamp to prevent a reset of the transformer; such that when the transformer is going into reset, the threshold is lowered to increase the selected period; and when the transformer is recovering the threshold is raised to decrease the selected period.

2. The lamp of claim 1, wherein the power stage comprises one or more power transistors and selectively disabling the power stage comprises disabling both the ON and OFF cycles of the power transistors.

3. The lamp of claim 1 wherein the selected period of the mains power cycle excludes a period during which any applied phase switch occurs.

4. The lamp of claim 1, wherein the light source is an electroluminescent device.

5. The lamp of claim 4, wherein the light source is a light-emitting diode.

6. The lamp of claim 1, wherein the drive circuit further comprises a rectifier and wherein the energy storage device comprises a capacitor connected to the rectifier.

7. The lamp of claim 6, wherein the capacitor is a bulk capacitor that provides a voltage source for the power stage, and wherein the lamp further comprises an output capacitor for providing energy to the light source.

8. A method of controlling power supplied to a light source by a drive circuit in a lamp, comprising selectively disabling a power stage of the drive circuit and supplying power through an energy storage device when the power stage is disabled; wherein the power stage is disabled throughout the course of a selected period of a mains AC power cycle, wherein the selected period of the mains AC power cycle comprises a period during which the magnitude of the mains voltage has a maximum value; and wherein the selected period of the mains AC power cycle is defined by a threshold, so that the power stage is disabled when the magnitude of a mains voltage is equal to or exceeds the threshold; wherein the threshold is dynamically adjusted according to an operation of a transformer for use with the lamp to prevent a reset of the transformer; such that when the transformer is going into reset, the threshold is lowered to increase the selected period; and when the transformer is recovering the threshold is raised to decrease the selected period.

9. The method of claim 8, wherein the power stage comprises one or more power transistors and selectively disabling the power stage comprises disabling both the ON and OFF cycles of the power transistors.

10. The method of claim 8, wherein the selected period of the mains power cycle excludes a period during which an applied phase switch occurs.

11. The method of claim 8, wherein the light source is an electroluminescent device.

12. The method of claim 11, wherein the light source is a light-emitting diode.

13. The method of claim 8, wherein the drive circuit further comprises a rectifier and wherein the energy storage device comprises a capacitor connected to the rectifier.

14. The method of claim 13, wherein the capacitor is a bulk capacitor that provides a voltage source for the power stage, and the lamp further comprises an output capacitor for supplying power to the light source.

15. A lighting system comprising an electronic transformer coupled with the lamp according to claim 1, the electronic transformer being arranged to convert a mains voltage to lamp operating voltage to be supplied to the lamp.

16. The lighting system of claim 15, further comprising a phase switching dimmer.

17. The lighting system of claim 16, wherein the dimmer is a trailing edge dimmer.

18. The lighting system of claim 16, wherein the dimmer is a leading edge dimmer.

19. The lighting system of claim 16, wherein the dimmer is a leading and trailing edge dimmer.

20. The lighting system of claim 16, comprising a mains AC waveform monitor/detector.

21. The lighting system of claim 20, wherein the mains AC waveform monitor/detector comprises a peak detector.

22. The lighting system of claim 16, comprising a detector arranged to detect one or more of: a presence of a dimmer; a type of dimmer; or a setting of a dimmer.

23. A method of controlling power supplied to a light source in a lighting system; comprising converting with an electronic transformer a mains voltage to a lamp operating voltage to be supplied to a lamp; coupling the lamp operating voltage with a lamp; and controlling power supplied by a drive circuit for a light source of the lamp comprising selectively disabling a power stage of the drive circuit and supplying power through an energy storage device when the power stage is disabled wherein the power stage is disabled throughout the course of a selected period of a mains AC power cycle, wherein the selected period of the mains AC power cycle comprises a period during which the magnitude of the mains voltage has a maximum value; and wherein the selected period of the mains AC power cycle is defined by a threshold, so that the power stage is disabled when the magnitude of a mains voltage is equal to or exceeds the threshold; wherein the threshold is dynamically adjusted according to the operation of the electronic transformer, to prevent a reset of the electronic transformer; such that when the transformer is going into reset, the threshold is lowered to increase the selected period; and when the transformer is recovering the threshold is raised to decrease the selected period.

24. The method of claim 23, wherein the lighting system further comprises a phase switching dimmer.

25. The method of claim 24, wherein the dimmer is a trailing edge dimmer.

26. The method of claim 24, wherein the dimmer is a leading edge dimmer.

27. The method of claim 24, wherein the dimmer is a leading and trailing edge dimmer.

28. The method of claim 23, comprising monitoring and/or detecting a mains AC waveform.

29. The method of claim 28, wherein said monitoring and/or detecting a mains AC waveform comprises peak detection.

30. The method of claim 23, comprising detecting one or more of: a presence of a dimmer; a type of dimmer; or a setting of a dimmer.

\* \* \* \* \*